(12) United States Patent
Tani (10) Patent No.: US 7,028,890 B2
(45) Date of Patent: Apr. 18, 2006

(54) IDENTIFICATION TAG AND IDENTIFIED OBJECT

(75) Inventor: Okie Tani, Tokyo (JP)

(73) Assignee: Tani Electronics Corporation, Tokyo (JP)

( * ) Notice: Subject to any disclaimer, the term of this patent is extended or adjusted under 35 U.S.C. 154(b) by 0 days.

(21) Appl. No.: 10/471,407

(22) PCT Filed: Mar. 15, 2002

(86) PCT No.: PCT/JP02/02506

§ 371 (c)(1),
(2), (4) Date: Sep. 11, 2003

(87) PCT Pub. No.: WO02/075644

PCT Pub. Date: Sep. 26, 2002

(65) Prior Publication Data

US 2004/0094630 A1    May 20, 2004

(51) Int. Cl.
*G06K 5/00* (2006.01)
*G06K 7/10* (2006.01)

(52) U.S. Cl. ............... 235/380; 235/375; 235/462.01

(58) Field of Classification Search ..............
235/462.01–462.25, 380, 375, 382, 382.5,
235/383, 386, 494, 456, 454
See application file for complete search history.

(56) References Cited

U.S. PATENT DOCUMENTS 4,239,261 A * 12/1980 Richardson ............. 283/74
5,118,369 A *  6/1992 Shamir .................... 156/64

FOREIGN PATENT DOCUMENTS

| JP | U 2-22871 | 2/1990 |
| JP | A 5-218148 | 8/1993 |
| JP | U 3043247 | 9/1997 |
| WO | WO 00/72228 | 11/2000 |

* cited by examiner

Primary Examiner—Thien M. Le
(74) Attorney, Agent, or Firm—Oliff & Berridge, PLC (57) ABSTRACT

An identification tag (101B, 102B, 103B, 104B) to be attached to a part (30) or similar object and recording a plurality of content relating to the part or similar object, wherein a plurality of color elements (105, 100N) indicated by different colors corresponding to the plurality of content are labeled and the plurality of color elements are read by an identifying means (11) for converting them to the plurality of content whereby the recorded plurality of content are recognized.

20 Claims, 9 Drawing Sheets

IDENTIFICATION TAG AND IDENTIFIED OBJECT

TECHNICAL FIELD

The present invention relates to an identification tag suitable for recording and displaying the manufacturing history and other content of products, parts, or other objects handled in industry, and to an identified object to which the identification tag is attached. Using the identification tag and identified object, it is possible to efficiently and accurately record, reproduce, manage, and otherwise process content relating to products, parts, etc. and to immediately identify sources of defects in a production process (production lines, production apparatuses, etc.) and possible to achieve smooth process control and system control.

BACKGROUND ART

Methods for recording specifications and other content of products, parts, etc. include, for example, color codes used for resistors (the example of replacing numerals of 0 to 9 with certain colors), bar codes, 2D codes, and other combination codes of dots, the Intacta code (registered trademark), etc.

Recording the above content using conventional bar codes etc. on the surface of a product, part, etc. is becoming difficult due to the increased diversity of parts (increase in amount of recorded information) and the increased miniaturization of parts (reduction of recording space).

Further, when recording content at products, parts, printed circuit boards, etc., it is considered necessary to be able to record the detailed manufacturing history from the viewpoint of identification or differentiation, inspection, searchability, and traceability. If based on this record, the history can be searched through. Recording such a detailed manufacturing history requires a relatively large space if using the conventional recording methods. With the existent products etc., there are many cases where display of such recorded content is sought despite the minimum required space not being present. It is extremely difficult to record such content with the conventional recording methods.

Further, with the conventional bar codes etc., writing the information required at each stage of the production of a product has been difficult due to the nature of things. Unrestricted recording in the code itself attached to a product was extremely difficult in terms of the system.

As prior art, there is the "Method of Recording of Identification Code for Printed Circuit Board, Method of Reading Identification Code, and Applied Apparatus" disclosed in Japanese Unexamined Patent Publication (Kokai) No. 3-229497. This prior art proposed the method of recording a large amount of identification information in the limited small space of a printed circuit board. FIG. 2 of that publication shows an identification code as a representative example. In this identification code, different sized rectangular patterns are combined and several simple colors are applied.

Further, the applicant previously made a proposal for utilization of color as a recording medium for information and for realization of a system of information conversion or information management etc. in a computer in the international application published as International Publication No. WO00/72228 (hereinafter the proposed colors and system utilizing the same referred to as the "already proposed colors" or "already proposed color system"). By considering applications of a recording method using the already proposed colors, the above recording of information becomes possible.

An object of the present invention is to solve the above problems and provide an identification tag designed to enable recording and display at any time of a detailed manufacturing history or other content of a large amount of information in accordance with necessity by utilizing the limited space at a product, part, printed circuit board, or other object and to enable traceability relating to the manufacturing history etc. of a product etc. and an identified object to which this identification tag is attached.

DISCLOSURE OF INVENTION

The identification tag and identified object according to the present invention are configured as follows:

An identification tag according to the present invention is an identification tag to be attached to a part or similar object and recording a plurality of content relating to the part or similar object, wherein a plurality of color elements indicated by different colors corresponding to the plurality of content are displayed, and the plurality of color elements are read by an identifying means for converting them to a plurality of content whereby the recorded plurality of content are recognized.

In the above identification tag, the part or similar object is identified, differentiated, inspected, searched, and traced based on the plurality of color elements.

In the above identification tag, the process of production of the part or similar object is managed and the production apparatus controlled using the plurality of color elements.

In the above identification tag, the part or similar object is a chip part to be mounted on a printed circuit board and a plurality of color elements are displayed at the small space of this chip part.

In the above identification tag, a top tape or other tape or cassette to be used for packaging or wrapping a chip part is given a label relating to a plurality of color elements and this label is used for identification and management of the chip part.

In the above identification tag, the plurality of content are comprised of an amount of use, remaining number, replacement period, inventory, sign of start or end of production, or other information relating to the part or similar object.

In the above identification tag, the plurality of content are recorded in real time at the stage of each process in accordance with need and are used for management, control, inventory-taking, and cost management of the part or its similar object and process by collection, recording, transmission, and communication of data and information.

In the above identification tag, when the part or similar object is a chip part to be mounted on a printed circuit board, any information including the specifications, date of manufacture, name of manufacturer, and manufacturing serial number of the printed circuit board, manufacturing serial number of the chip part, name of factory, manufacturing time on the line, and supervisor is made researchable based on the differentiation and inspection of the printed circuit board.

In the above identification tag, the plurality of color elements include color elements to which content has been assigned and color elements to which content has not been assigned and content required at a stage in the middle of a process is assigned to color elements to which content has not been assigned.

In the above identification tag, the above process is an assembly process and the assigned content includes a supervisor of the assembly line and an assembly date and time.

The identified object according to the present invention is given an identification tag on which a plurality of content are recorded by being labeled with a plurality of color elements indicated by different colors corresponding to the plurality of content, and the plurality of color elements are read by an identifying means for converting them to the corresponding plurality of content to enable the recorded plurality of content to be recognized.

In the above identified object, the object is identified, differentiated, inspected, searched, and traced based on the plurality of color elements.

In the above identified object, the process of production or the production apparatus is controlled and managed using the identification tag.

In the above identified object, the identification tag is attached at a small space.

In the above identified object, the plurality of content are comprised of an amount of use, remaining number, replacement period, inventory, sign of start or end of production, or other information.

In the above identified object, the plurality of content are recorded in real time at the stage of each process in accordance with need and are used for management, control, quality control, inventory-taking, and cost management of the part or its similar object and process by collection, recording, transmission, and communication of data and information.

In the above identified object, the plurality of color elements in the identification tag include color elements to which content has been assigned and color elements to which content has not been assigned and content required at a stage in the middle of a process is assigned to color elements to which content has not been assigned.

In the above-identified object, the above process is an assembly process and the assigned content includes a supervisor of the assembly line and an assembly date and time.

In the above-mentioned identification tag and identified object according to the present invention, by utilizing a plurality of color elements (color dots etc.) based on the constitution relating to the already proposed colors or a color code used for conversion relating to the same, it is possible to record a required plurality of content in a difficult-to-record small space of a part or similar object.

It is also possible to use other colors similar to the plurality of color elements based on the constitution relating to the already proposed colors or extremely fine bar codes.

The above "identification tag" is a label of a plurality of color elements, that is, something which can record content on a difficult-to-record space, enables information to be read and information to be written in combination with a computer system when necessary, and enables the necessary conversion corresponding to the content.

The identification tag is mainly one of color dots and color stripes (bar code-like one, combination of fine lines at different intervals, etc.)

Further, the above "identified object" is an object to which the identification tag is given by printing, adhesion, etc. As examples of identified objects, there are products and parts, specifically chip parts, reels, mounting tape, top tape, printed circuit boards, etc.

The specific matter recorded on the identification tag is as follows for each identified object.

In the case of a chip part, it includes a set number indicating the type of part, the order on the tape, the manufacturer manufacturing serial number, and other part details, for example, an indication of the polarity of a capacitor, etc. In the case of a reel, a piece of the identification tag of the top tape is attached to confirm the identity of the part. In the case of a mounting tape, colors are used for numbering from the first part to the last part. In the case of a top tape, it includes a set number indicating the type of the part, the manufacturer manufacturing serial number, and other part details. In the case of a printed circuit board, it includes the specifications, manufacturing date, manufacturer manufacturing serial number, etc.

The identification tag and identified object given the identification tag enable recording, display, reproduction, management, etc. of content relating to a product, part, etc. (matter relating to manufacture etc.), can be used for immediate identification of the source of defects in the production process (production lines, production apparatuses, content of work, workers. etc.), and enable process management and process control.

Taking note of the characteristics of color proposed by the applicant in the previously mentioned international application, color is used as a medium for expressing data or information at a location with an extremely small space. The type or difference in color for each dot is linked with a plurality of data, and information is recorded at a difficult space by the color dots or coating of color and the color difference. By utilizing a plurality of dots, recording can be increased and the extreme reduction in space available for recording (or storage) of information can be dealt with.

There are various types of items on which content cannot be indicated such as surface mounted parts, chip parts, and other small parts of electrical components, for example, quartz oscillators, printed circuit boards, injection and transfusion bags, prescription instruction sheets, operator records, and other small objects. The identification tag according to the present invention can be recorded with information enabling content to be recognized.

For surface mounted parts, chip parts, printed circuit boards, and other similar products and parts requiring recording of various content, space where recording of that content is difficult is printed with for example the already proposed colors to label that location of the space with the already proposed colors able to be converted to content by identifying means enabling conversion to corresponding content. Further, based on the color code of the identifying means, the colors are converted to enable the recorded content to be recognized. The object labeled with the already proposed colors is the "identification tag".

The recorded content corresponding to the color code is made to be recognizable by an identifying means enabling conversion to the content by for example color dots etc. applied to the identified object so as to enable the content to be recognized when that recorded content is required at the identified object, for example, for identification, differentiation, inspection, search, or tracing of the object.

Based on the identification tag of the colors at the very small space able to be identified by the identifying means, products, parts, etc. can be identified or inspected, processes managed, and apparatuses controlled independently or in combination by attachment of the identification tag, preparation by a printing apparatus, etc.

The identifying means is used to attach an identification tag to a small space of a chip part to identify the chip part as an object. Further, the chip part is managed as required by identification by the identifying means.

When the identified object is a part, based on the identification tag, the necessary content such as the type of the part, the set number, quantity, number used, remaining number, inventory, manufacturing date, company name, line, and fabricator can be recorded and identified. Based on the identification tag, a grasp can be obtained of the content, and the parts managed in various ways, for example, products managed, quality controlled, and other necessary control performed. Further, the apparatuses relating to the identified object, that is, part, are controlled. The apparatuses required for display, printing, communication, etc. and the apparatuses required for process control are suitably configured.

A plurality of parts given identification tags, assemblies made up of these parts, various processes relating to these parts, and the production apparatuses may be controlled using the identification tags.

The identification tag is attached to or printed on an identified object by an attachment apparatus or printing apparatus.

The content of the chip parts etc. can be displayed by the identification tag, content can be input and output by the identification tag, and the identification tag or identified object can be differentiated and inspected.

A method of display using a fine bar code configured to be displayable as an identification tag, display by such a fine bar code, and an input/output apparatus enabling such display are also proposed.

The above identification tag is comprised of colors or color dots using the above-mentioned already proposed colors. The identification tag is attached, stuck on, or printed, and a part is identified and managed based on the identification tag.

The identification tag may be attached to the top tape for a reel or other tape or cassette for packaging or wrapping chip parts and the part identified and managed based on the identification tag.

Using the identification tag, the amount of use, remaining amount, replacement time, inventory, sign or information of the start and end of production or combinations of the same are recorded in real time. The products, parts, or processes are managed and controlled, quality is controlled, and inventory and costs are managed by collection, recording, transmission, and communication of the data or information.

The invention also includes an identification and management apparatus for identification and management based on identification tags, an information input/output apparatus, and a differentiation and inspection apparatus.

Identification and management become possible by using the identification tag according to the present invention instead of the conventional ordinary identification method and identification apparatus.

An inspection apparatus and information input/output apparatus enabling differentiation and inspection of a printed circuit board mounting a chip part by the identification tag are also realized.

A printed circuit board mounting a chip part with an identification tag is also configured.

By using the identification and management of products or parts based on the identification tag and attaching the identification tag to a printed circuit board, it becomes possible to research the manufacturing serial number of the chip part, the factory name, the time of manufacture on the line, the supervisor, and any other information based on differentiation and inspection of the printed circuit board.

The identification tag is formed by various colors using the already proposed colors, the identification tag is attached to the part or printed circuit board having the usual space, and thereby identification and management are enabled. The specifications, manufacturing date, name of manufacturer, and manufacturing serial number of the printed circuit, the manufacturing serial number of the chip part, name of factory, manufacturing time on line, supervisor, and other information may be selected and that information searched.

Further, the present invention provides a configuration preparing and attaching an identification sheet of top tape for use for comparison, inquiry, and management.

BEST MODE FOR CARRYING OUT THE INVENTION

Hereinafter, embodiments of the present invention will be explained with reference to the drawings.

In these embodiments, the explanation will be given with reference mainly to the example of a chip part. A chip part is a part used for a surface mounting printed circuit board of an electrical product. Note however that the present invention is not limited in application to a chip part of course.

Figure 1:
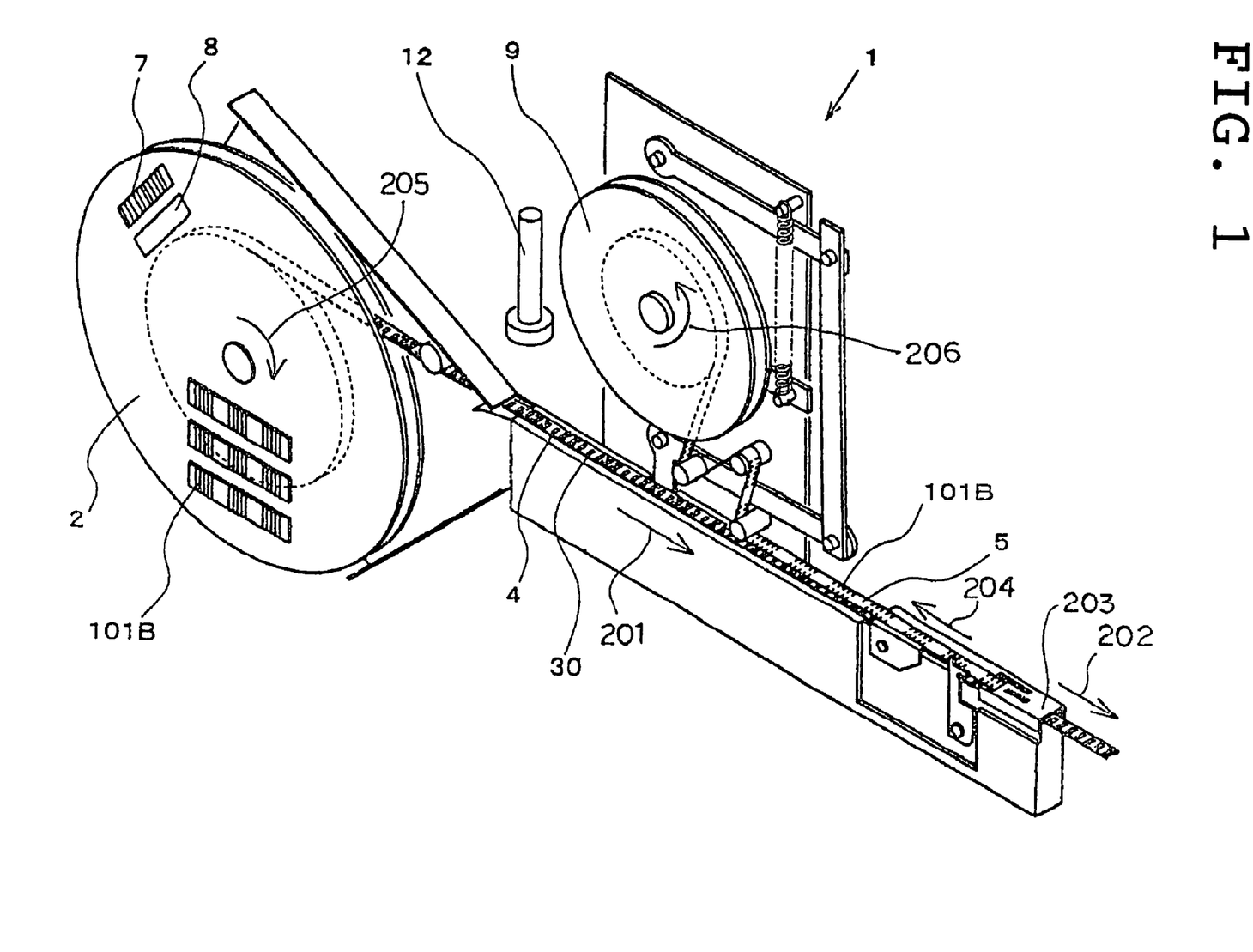
FIG. 1 is a view of the configuration of an apparatus relating to a part reel cassette.

FIG. 1 is a general perspective view of a part reel cassette. In the part reel cassette 1, at the part reel 2, a large number of chip parts 30 are taken up by a part mounting tape 4. The large number of chip parts 30 are mounted on the part mounting tape 4 at certain intervals and are protected by being covered by a top tape 5 as a protective sheet. That is, the chip parts 30 are taken up on the part reel 2 in a state mounted on the part mounting tape 4. The chip parts 30 are carried at carrying locations formed on the part mounting tape 4 and thereby are arranged in a single line in the longitudinal direction of the part mounting tape 4. In FIG. 1, the part mounting tape 4 is moving in the direction shown by the arrows 201 and 202. During the movement of the part mounting tape 4, the top tape 5 is peeled off from the part mounting tape 4 at the location 203 before reaching the part chuck portion, moves as shown by the arrow 204, and is taken up by a protective sheet take-up reel 9.

In FIG. 1, the direction of rotation of the part reel 2 is shown by the arrow 205, while the direction of rotation of the protective sheet take-up reel 9 is shown by the arrow 206.

Figure 6:
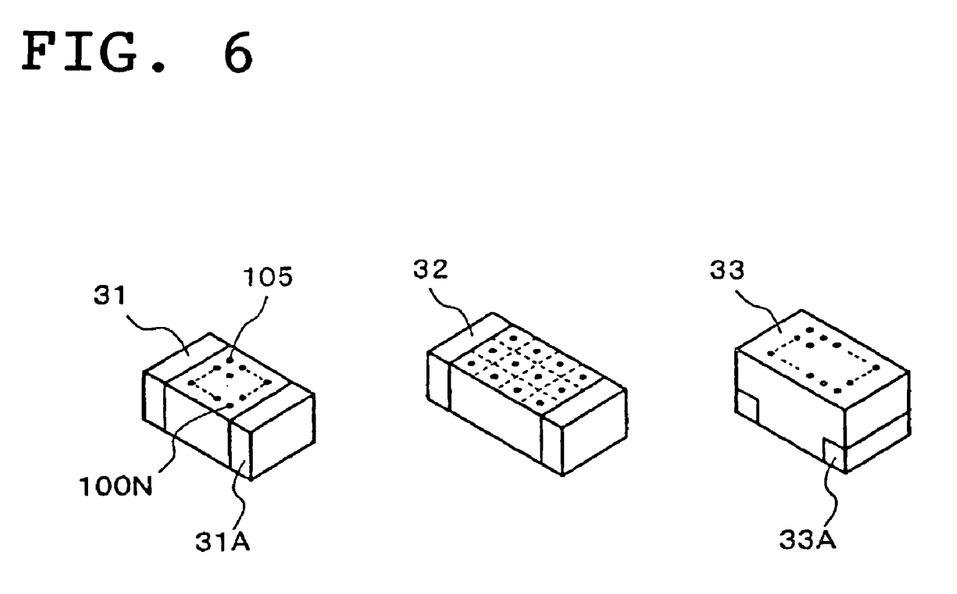
FIG. 6 is a perspective view of examples of surface mounted parts.

The outer surface of the part reel 2 has attached to it an identification sheet 8 and identification bar code 7 describing details of the chip parts 30 and other necessary information and specifications. The chip parts 30 are generally small in size with little surface area etc. and therefore lack recording space and are not recorded with any information at all. For example, as shown in FIG. 6, "3216", "1608", "1005", "0603", and other block shaped parts 31, 32, and 33 are being made increasingly smaller in size. Note that the numerals "0603" for example indicate the dimensions of predetermined locations of the parts (0.6 mm horizontal×0.3 mm vertical). The space available for printing an identification tag of this "0603" mm chip part is, after subtracting the space for soldering, about 0.12 mm². Other diverse electrical components are being used, but all of them increasingly feature less space. To identify individual parts, differentiation not relying on electrical testing is desired.

The color dots used have diameters of for example about 30 μm. The color dots can be displayed in matrices of 6 dots horizontally and 4 dots vertically for a total of 24 dots. Each color dot has a diameter of from 100 μm to a diameter of 30 μm when using 24 color dots.

The color dots can be used as recording media for the small space on the chip parts 30. By using such colors, the small space of the recording medium can be utilized as a storage medium.

Figure 5:
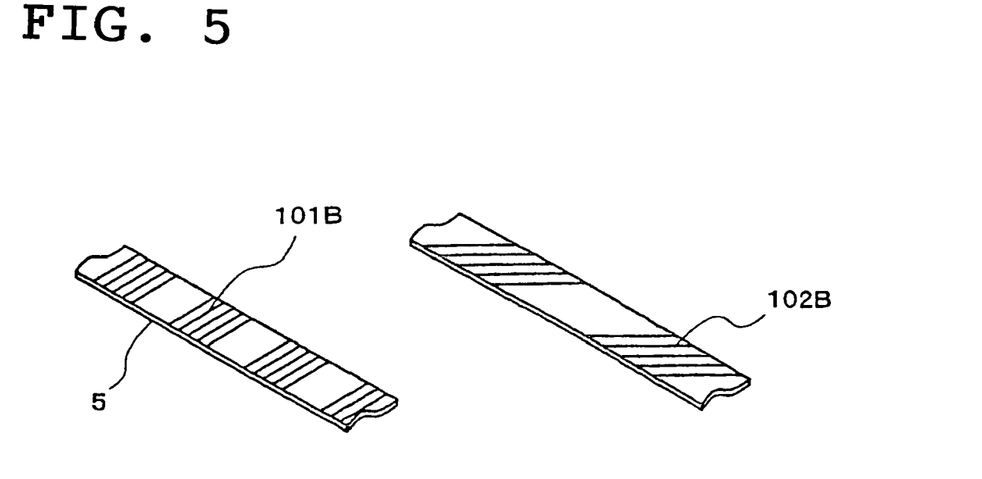
FIG. 5 is a perspective view of examples of identification tags of a top tape or attachment seal.

Colors are used for the identification mark 101B displayed on the top tape 5 of a chip part 30. As the identification mark 101B on the top tape 5, use may be made of the color dots 105 and 100N as shown in FIG. 6 or the color stripes or rectangles 101B, 102B as shown in FIG. 5. The identification tags on the top tape 5 indicated by reference numerals 101B and 102B shown in FIG. 5 are of the same colors as the colors on the chip parts 30 and are formed by dots, lines, stripes, or any other shape in a range visible to the naked eye. The colors of the identification tags on the top tape 5 are made the same as the case of the colors of the dots on the chip parts from the viewpoints of the ease of differentiation by the color difference in viewing and the abundance of memory by the colors.

The identification tags are attached to the top tape at the time of fabrication of the reel cassette. The identification tags are printed by a color printer in accordance with the identification tag of the part reel. The top tape is directly printed with the tags or is given the printed identification tags.

An identification tag attached to the tape surface is peeled off and attached at the mounting position of a mounting machine to be used at the time of reel replacement for determining the identity of reel and for differentiating from the exchanged reel.

Figure 2:
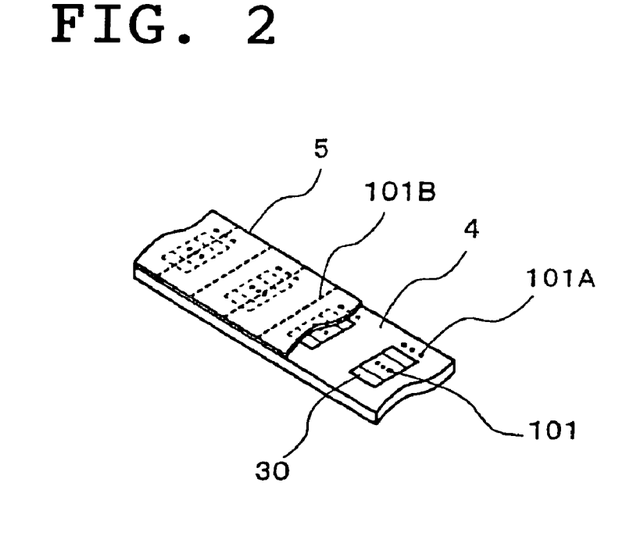
FIG. 2 is a partial perspective view of the state and mode of packaging of a chip part by top tape in the part reel cassette.

FIG. 2 is a partial view of an example of the shape of a chip part 30 designed to be mounted on a part mounting tape 4 and protected by a top tape 5. An identification tag 101A is printed on the part mounting tape 4, while an identification tag 101B of the same color as the identification tag 101A is printed on the surface of the top tape 5. By providing colors used as an identification tag adjoining the chip part 30, management of a large number of chip parts 30 taken up on a part reel 2 becomes possible. The identification tags 101A printed on the part mounting tape 4 are used to number the chip parts from the first chip part to the last by color coding. The chip parts 30 can be identified by the color dots 105 on the chip parts.

The number of the chip parts 30 used, the remaining number, etc. on the part mounting tape 4 can be managed in real time.

Figure 3:
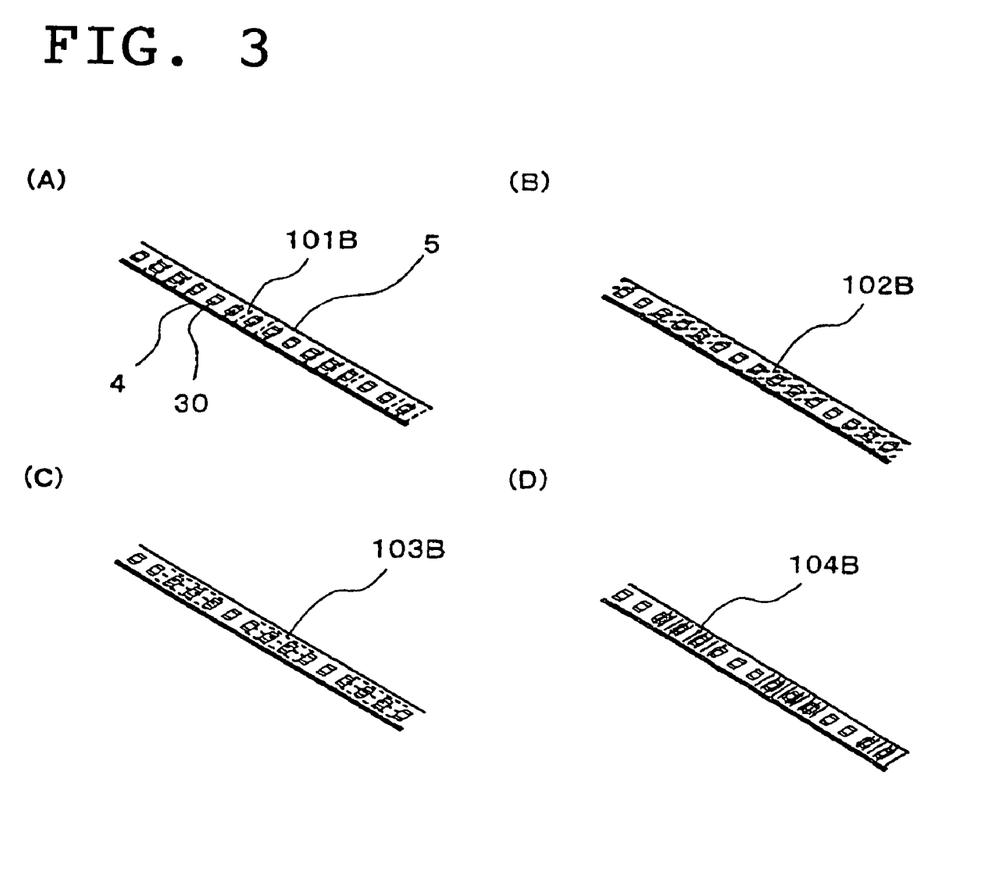
FIG. 3 is a perspective view of examples of identification marks of a top tape.

FIG. 3 shows examples of the mode of display of an identification tag attached on the top tape 4. (A) shows a mode of display arranging the identification tag 101B so as to perpendicularly intersect the longitudinal direction of the top tape 5, (B) shows a mode of display arranging the identification tag 102B at a slant with respect to the longitudinal direction of the top tape 5, (C) shows a mode of display arranging the identification tag 104B in parallel with the longitudinal direction of the top tape 5, and (D) shows a mode of display arranging the identification tag 104B in parallel in fine lines in the form of a bar code. At this time, the colors used at the identification tags 101B, 102B, 103B, and 104B are the same as the colors used for the identification tags of the chip parts 30. The identification tags to be attached on the top tape 5 may be of any shape or form.

The colors on the reel can be formed in diverse ways with individual shapes up to the full extent of the width since the reel is narrow in width, but long in the longitudinal direction and therefore are easy to recognize.

Figure 4:
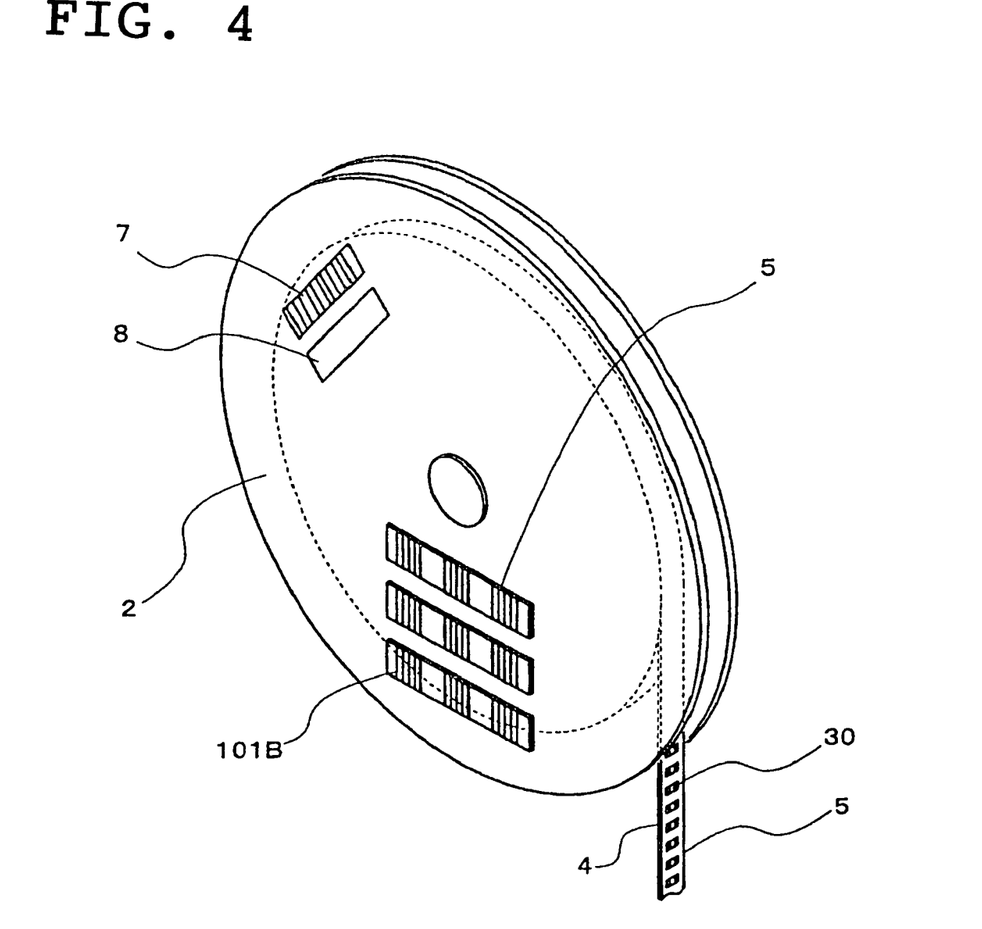
FIG. 4 is a perspective view of an example of a part reel.

FIG. 4 shows the configuration of a color identification tag 101B the same as the tag attached to the top tape 5 attached to the side of the part reel 2 where the identification sheet 8 is attached. By peeling off the color identification tape and sticking it at a visible position at the mounting location of the part reel cassette 1, this can be used as material for determination of identity at the time of replacement of reels.

FIG. 5 shows two examples of top tape 5 provided with color identification tags configured to be able to be peeled off or stuck on.

FIG. 6 shows examples of surface mounted parts. Reference numerals 31, 32, and 33 in the figure are chip parts having block shapes and include resistors, capacitors, etc. These are the above-mentioned "1005", "0603", or other chip parts. Reference numerals 31A and 33A in the chip parts 31 and 33 show soldering positions. In the chip part 31, identification tags 105 and 100N are printed at the small space. In the individual chip parts 31, 32, and 33, the necessary content is recorded using the identification tags 105, 100N as recording media. The dots of the identification tags are used as storage media alone or in combination.

The lattice-shaped broken lines drawn on the surface of the chip parts 32 indicate sections and regions of storage by dot addresses which have the function as media for storing the color dots and the function as recording codes and recording media of the parts. For example, even if the same colors are used, if the address differs, the recorded content of the colors will differ and therefore the same colors can be used in a variety of ways. The chip parts 33 are examples of ones where the part soldering locations 33A are at the bottoms of the parts.

It is possible to configure the dot colors in a plurality of ways based on the number of the color dots. For example, a first dot color is used for recording the set number of parts, a second dot color is used for obtaining a grasp of the order on the reel or the number of parts used or for recording information relating to inventory control, a third dot color is used for recording details of the parts such as the manufacturer serial number, a fourth dot color is used for recording detailed specifications, and a fifth dot color is used for recording other necessary matter such as the polarity of the capacitor. In this way, it is possible to use a plurality of dot colors for various applications. This may be applied not only to chip parts mounted on a tape, but also separate chip parts in a cassette case. First, it is also possible to use a single color dot to record all of the above-recorded content. This is done by combining the position and color of the dot in a certain space.

Note that the surface mounted parts are not limited to the above chip parts 31, 32, and 33. There are also connectors, ICs, QFPs (quad flat packages), BGA (ball grid arrays), CSPs (chip part scale packages), quartz oscillators, etc. By mode, there are axial and radial parts etc.

Figure 7:
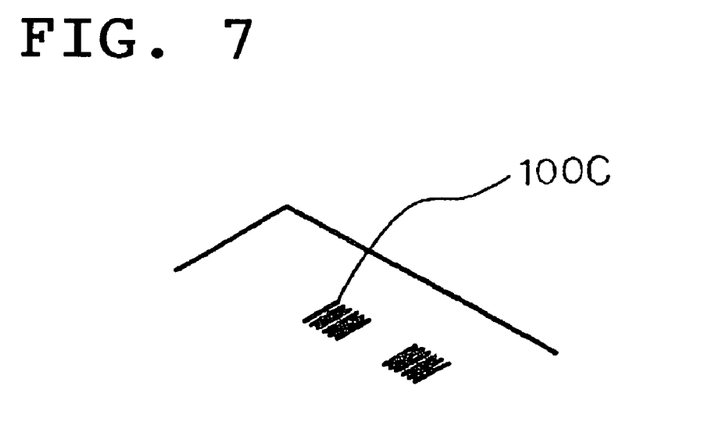
FIG. 7 is a perspective view of an example of substitution of color by an extremely fine bar code.

FIG. 7 shows a bar code 100c of extremely fine lines. This shows replacement of the colors by extremely fine lines.

Figure 8:
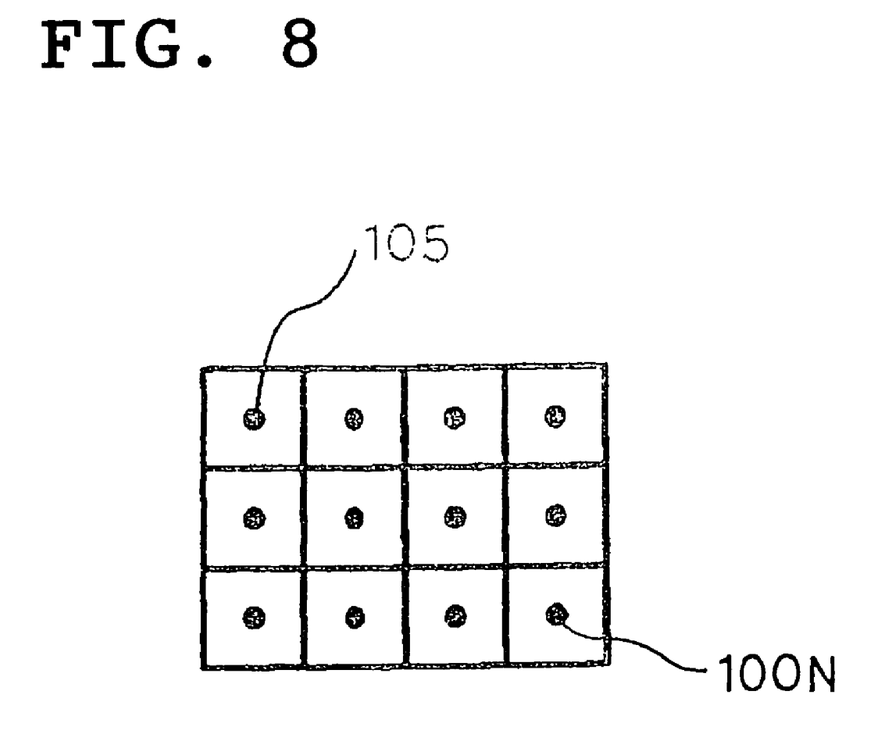
FIG. 8 is an enlarged view of an example of an identification mark of a chip part.

FIG. 8 shows enlarged the colors displayed on a block shaped chip part 32 shown in FIG. 6 and a recording frame. This enables display in any other space. The functions as a recording medium etc. are similar.

Figure 9:
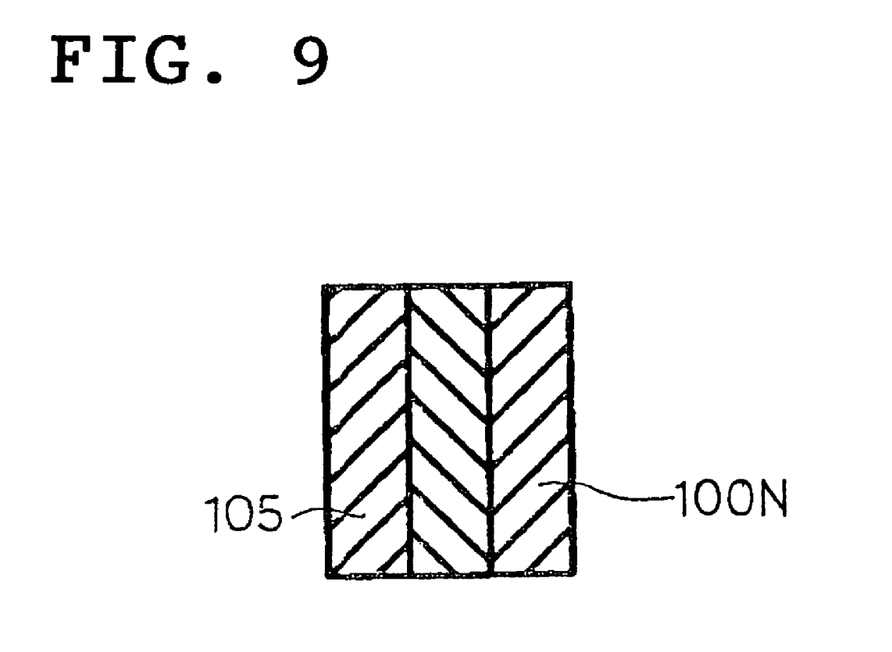
FIG. 9 is an enlarged view of an example of an identification mark.

FIG. 9 is an example of displaying the colors by rectangular or stripe shaped graphics 105 and 100N instead of dots. By forming the display mode of the colors at the rectangular planar surfaces, it is possible to smooth and stabilize the chucking surfaces at the mounting machines and avoid chucking error.

Figure 10:
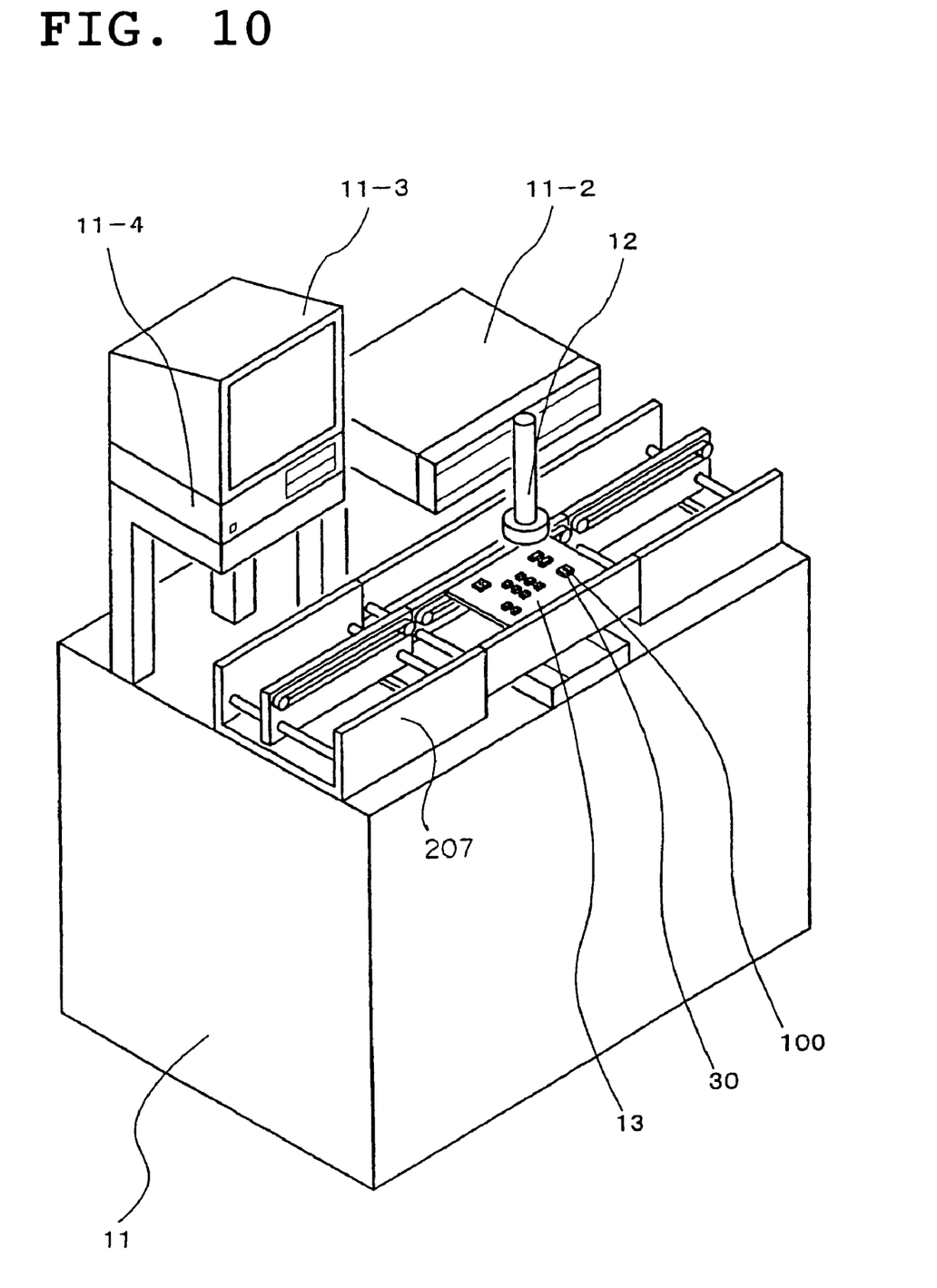
FIG. 10 is an external perspective view of an apparatus for input/output for display and differentiation and inspection.

FIG. 10 is a schematic view of an apparatus for input/output of a display relating to an identification tag and for differentiation or inspection of the display content of an identification tag. During the production process, a printed circuit board 13 is conveyed by a conveyor 207. A plurality of chip parts is mounted on the surface of the printed circuit board.

In FIG. 10, an image of the identification tag 100 of one chip part 30 surface mounted on the printed circuit board 13 is captured by a CCD camera 12. The CCD camera 12 recognizes the identification tag 100 and uses it for differentiation and inspection. It can recognize the information recorded by the identification tag 100. Due to this, it is possible to manage and control parts and possible to convert an identification tag to the corresponding content or required content.

Inventory control, quality control, process control, etc. become possible based on the information converted from the identification tag 100.

In FIG. 10, 11 is a differentiation and inspection apparatus. The differentiation and inspection apparatus 11 is provided with a related apparatus 11-2 required for input and output of information, a monitor 11-3 provided with an image processing function, and a computer 11-4. The differentiation and inspection apparatus 11 has the function of an information input device and is configured to freely record and edit content due to the differentiation, record inspections, and record and edit details of specifications based on the identification tag 100. Using the information obtained by the differentiation and inspection based on the differentiation and inspection by the differentiation and inspection apparatus 11, it is possible to use clearly investigate the manufacturing serial number of the part, the factory name, the time of manufacture on the line, the supervisor of the work, and other recorded content. A printed circuit board 13 mounts a large number of diverse chip parts all together. Due to this mixed mounting, there is a difference in the height of the chip parts which can be detected by the CCD camera 12. Therefore, the CCD camera 12 is designed to be freely changed in power in accordance with the height.

In mounting a chip part 30 by a mounting machine, by recognizing the identification tag of a Z-mounted part, control and management of the part, its process of use, and the apparatuses used become possible. In the case of for example a printed circuit board, by recognizing the identification tag of a part at the time of Z-mounting in an apparatus for mounting a chip part to be identified at a predetermined position based on specifications, it is possible to control and manage the part, the process of use, and the apparatus used. When fixed at the Z-axis, a configuration moving a chuck is used. Further, the chip part 30 of the printed circuit board is mounted by being held by a chuck. Movement along the Z-axis of the mounting machine is controlled to move the chuck to the Z-axis position through the XY axes of the printed circuit board for mounting. Further, there is also a configuration wherein a mounting hand chuck is moved to the mounting position of the cassette of the randomly mounted parts 30 for mounting the parts.

Figure 11:
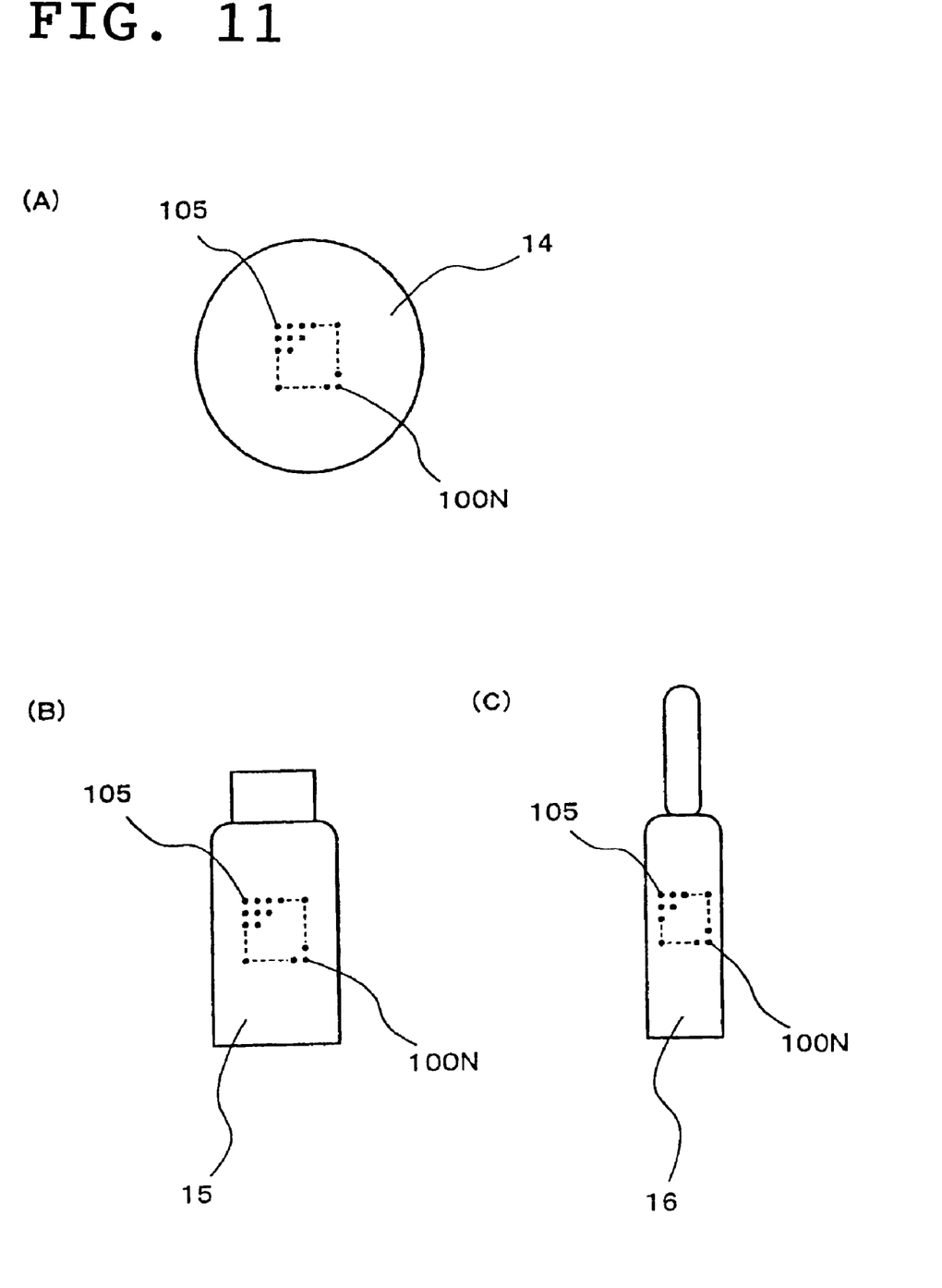
FIG. 11 is a view of an example of application of the identification tag to other objects.

FIG. 11 shows objects to which identification tags are attached other than the above-mentioned chip part (identified object). (A) shows another general abstract identified object 14, (B) shows a drug pack or drug kit 15, and (C) shows an ampule 16. The identified objects 14, 15, and 16 are given the identification tags by the recording media 105 and 100N. These recording media are comprised of colors.

Figure 12:
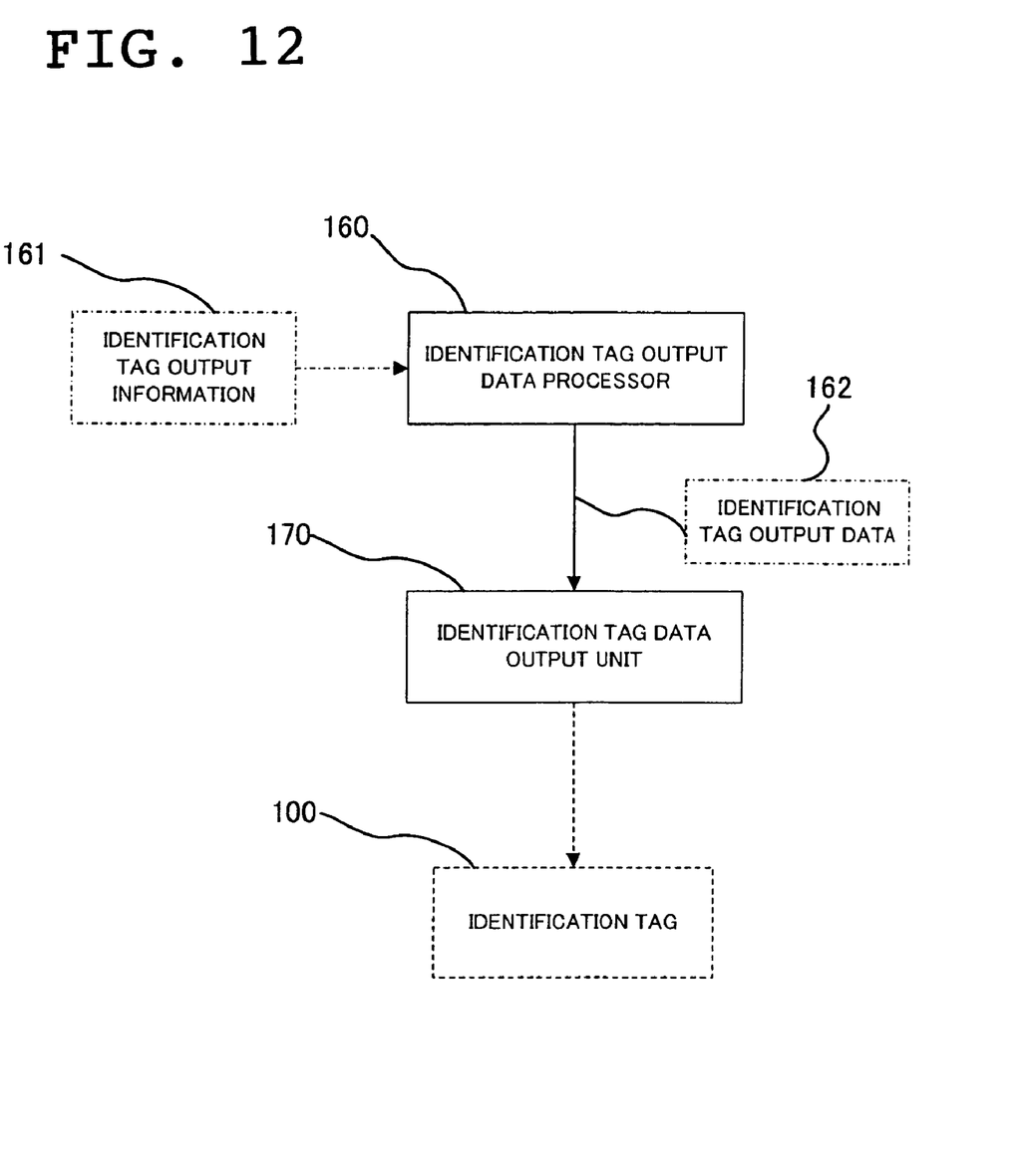
FIG. 12 is a process chart of the flow of preparation of an identification tag.

FIG. 12 shows the flow when preparing an identification tag. Identification tag output information 161 is given to an identification tag output data processor 160. The identification tag information 161 includes for example specification information of the part, a bar code of a part cassette, information relating to the manufacturing specifications, information relating to the manufacturing history, etc. The identification tag output data processor 160 processes identification tag output information and supplies it to an identification tag data output unit 170 as identification tag output data 162. The identification tag data output unit 170 outputs the identification tag 100 as the identification tag output data 162.

The identification tag data output unit 170 outputs data to the surface mounted part, for example, chip part, attached tape, or top tape, outputs data to the cassette or other case, and outputs data to the printed circuit board etc. Further, in regard to the output, it is possible to link information with colors in advance and convert the colors to predetermined information based on a correspondence 121 (shown in FIG. 13).

Further, according to the above configuration, for the purpose of managing the production process (manufacturing line), it is possible, for example, to use random colors in advance to print a large number of color dots as an identification tag on a printed circuit board and then use this for recording any information at the later production process or other various processes. In this case, at the initial stage, it is possible to set things so that no recorded matter is assigned at all to any of the plurality of color dots or so that recorded matter is not assigned to part of it and to assign for example "assembly line supervisor", "assembly date and time", or other information to the color dots read when reading the color dots by an identification tag data reader at a later production process or assembly process and to manage the information as records corresponding to the read color dots by a computer.

Figure 13:
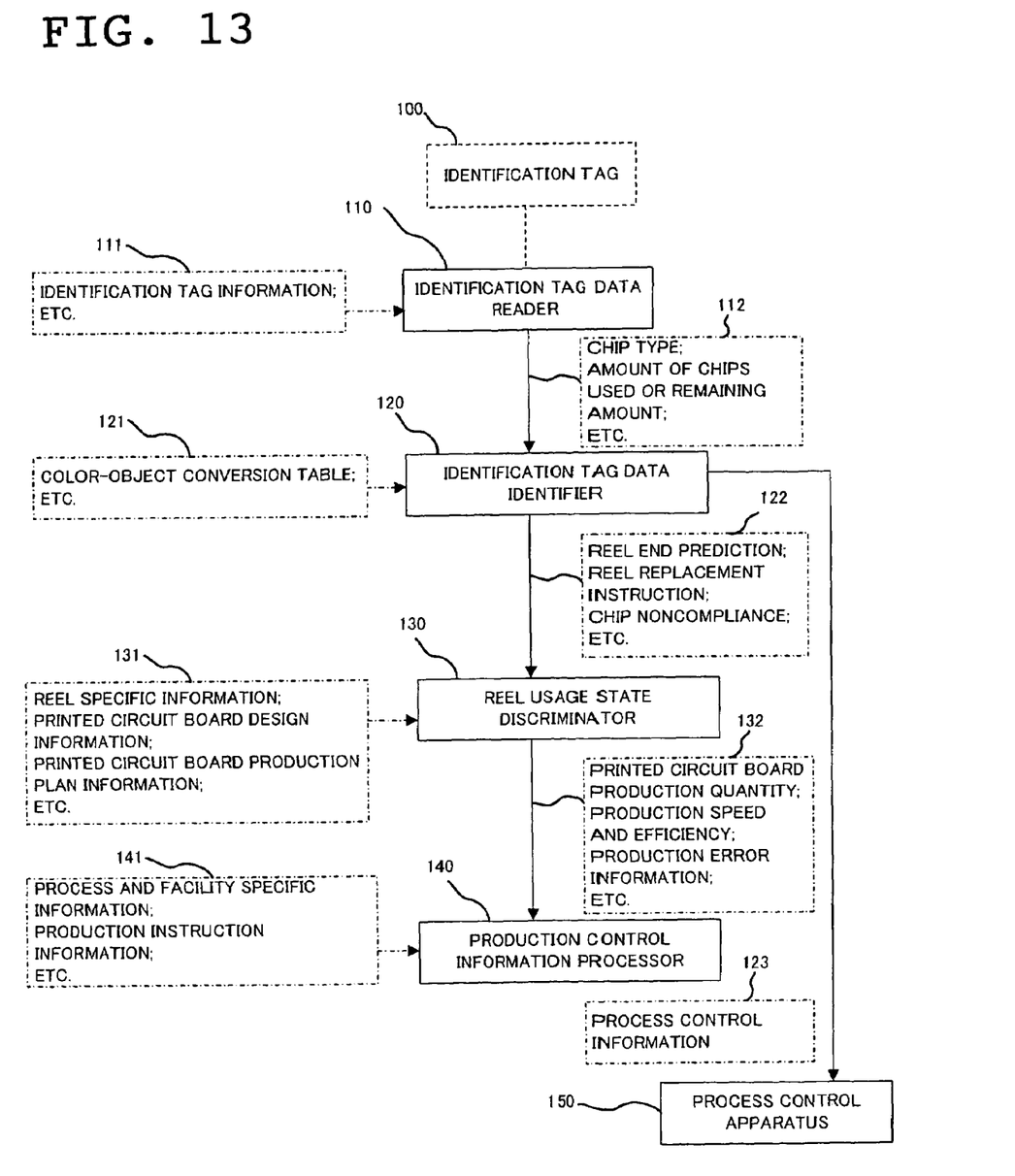
FIG. 13 is a process chart of the flow of reading and processing of an identification tag.

FIG. 13 shows the flow of reading and processing of an identification tag 100.

Regarding the data to be recorded on an identification tag 100, identification tag information 111 is referred to so as to detect the colors, color codes, bar code read values, etc. by a reader 110 and read the information recorded there. Due to this, the type of the chip part, the amount of the chip parts used, the remaining amount, and other matter, that is, the identification tag data 112, is read. The identification tag data 112 read by the reader 110 is sent to an identifier 120.

The identifier 120 identifies the identification tag data based on a color-object conversion table 121 etc. The identifier 120 enables identification and certain instructions and predicts the end of a reel based on the state of use of the reel of the identification tags, instructs replacement of reels, and identifies and differentiates chip part noncompliance and other matters 122. Further, the identifier 120 controls the process for a process controller 150 based on process control information 123. "Process control" includes, for example, control of the chuck when mounting a chip part at a surface mounting apparatus of a process, control of a differentiation and inspection process by an identification tag of a mounted part at a printed circuit board, control of a handling operation of a part by a mounting machine, etc.

A differentiator 130 differentiates the state of use of a reel based on reel specific information, printed circuit board design information, printed circuit board production plan information, etc. (block 131). The differentiator 130 obtains a grasp of the printed circuit board production quantity, the speed and efficiency of production, production error information, etc. (block 132). The information shown in the block 132 is supplied to a processor 140.

The processor 140 processes the production control information and manages the system as a whole based on the process and facility specific information, production instruction information, etc. (block 141).

The above-mentioned reader 110, identifier 120, differentiator 130, and processor 140 are designed to be independent or linkable. The data is designed to be able to be freely displayed, printed, or communicated. The various arrows shown in FIG. 13 show the flow of this data and indicate transmission inside a computer or communication. The groups of the blocks shown by the broken lines or the dot-dash lines show necessary files or information at the different units.

Above, a representative embodiment of the present invention was explained, but as shown in FIG. 11, the identification tag can be used for diverse applications and can be modified in accordance with the applications in so far as not exceeding the gist of the invention. For example, the identification tag can be modified for identification and management of a quartz oscillator, laser oscillator, or other small part. Further, it may be used as an identification tag for a hard to label decorative article. Further, the manufacturing history of the printed circuit board may be recorded by the identification tag.

In accordance with the present invention, it is possible to record information at an extremely small space difficult in the past, to recognize and identify information recorded, and to control inspection, processes, and apparatuses. By increasing the fineness of the bar code, new uses and the function of color as a recording medium can be made use of.

Further, in accordance with the present invention, quality control and cost management become possible by the previously difficult real time recording and collection, recording, transmission, and communication of data or information. Usual identification methods and identifying means can be replaced. In particular, differentiation and inspection of printed circuit boards mounting a plurality of chip parts are facilitated. Searches of the manufacturing serial number of products or parts, the factory name, the manufacturing time on the line, the supervisor, and any other information are made possible. Small, fine spaces and top tape and part mounting sheets can be made effective use of. Recording, reproduction, transmission, communication, inspection, and management of the content of any parts become possible in real time. Inquiries about mounted parts by color at the cassettes and apparatuses are facilitated. Assembly processes of assembly parts to be used in assembly machines using colors and checks and management of the same are facilitated for a large economic effect.

INDUSTRIAL APPLICABILITY

Recording of information on difficult-to-record spaces is made possible by fine parts etc. and chip parts are recognized and identified to enable inspection control, process control, and control and management of apparatuses. Since processes can be controlled based on identification tags for the parts, processes, inventory, progress, and materials can be managed in real time. The economic effect is extremely great in terms of management.

The invention claimed is:

1. An identification tag comprising:
   a plurality of color elements; and
   means for attaching the identification tag to an object;
   wherein each color element is one of a plurality of colors labeled on said identification tag,
   wherein said plurality of color elements is used as an information recording medium for recording a plurality of contents,
   wherein the plurality of color elements are read by an identifying means,
   wherein a color code table converts the read plurality of color elements to said plurality of contents, and
   wherein the plurality of color elements may be written to or read from at a plurality of stages within a process.

2. The identification tag of claim 1, wherein said object is at least one of identified, differentiated, inspected, searched, or traced based on said plurality of color elements.

3. The identification tag of claim 1, wherein a process of production of said object is managed and a production apparatus is controlled using said plurality of color elements.

4. The identification tag of claim 1, wherein said object is a chip part to be mounted on a printed circuit board, and said plurality of color elements are labeled on the chip part.

5. The identification tag of claim 1, wherein the identification tag is attached to one of a top tape or a cassette used for packaging or wrapping a chip part, and the identification tag is used for identification and management of said chip part.

6. The identification tag of claim 1, wherein said plurality of contents includes at least one of an amount of use, a remaining number, a replacement period, an inventory, a sign of start or end of production relating to said object.

7. The identification tag of claim 1, wherein said plurality of contents are recorded in real-time at a stage of the process in accordance with need and are used for at least one of management, control, inventory, or cost management of said object and process.

8. The identification tag of claim 6, wherein said object is a chip part to be mounted on a printed circuit board and the plurality of contents includes at least one of a specification of said printed circuit board, a date of manufacture, a name of manufacturer, a manufacturing serial number of said printed circuit board, a serial number of said chip part, a name of factory, a manufacturing time, or an operator.

9. The identification tag of claim 1, wherein said plurality of color elements includes color elements to which said content has been assigned and color elements to which said content has not been assigned, and content required at a stage in a middle of a process is assigned to said color elements to which said content has not been assigned.

10. The identification tag as set forth in claim 9, wherein said process is an assembly process and said assigned content includes at least one of a an operator of the assembly line or an assembly date and time.

11. A method of identifying an object, comprising:
labeling an identification tag with a plurality of color elements, wherein the plurality of color elements are used as an information recording medium to write a plurality of contents to the information tag;
attaching the information tag to an object;
reading the plurality of color elements on the information tag attached to the object using an identifying means; and
converting the plurality of read color elements to said plurality of contents using a stored color conversion table, thereby allowing said recorded plurality of contents to be recognized.

12. The method of claim 11, wherein the object is at least one of identified, differentiated, inspected, searched, or traced based on said plurality of color elements.

13. The method of claim 11, wherein a process of production is managed or a production apparatus is controlled using said identification tag.

14. The method of claim 11, wherein said identification tag includes a labeled surface area that is less than 0.12 mm$^2$.

15. The method of claim 11, wherein the plurality of contents includes at least one of an amount of use, a remaining number, a replacement period, an inventory, a start indicator or an end of production indicator.

16. The method of claim 11, wherein the plurality of contents are recorded in real-time at a stage in a process and the plurality of contents are used for at least one of management, control, quality control, inventory, or cost management of the object and the process.

17. The method of claim 11, wherein said plurality of color elements in said identification tag include color elements to which said content has been assigned and color elements to which said content has not been assigned, and wherein content required at a stage in the middle of a process is assigned to said color elements to which said content has not been assigned.

18. The method of claim 17, wherein said process is an assembly process and said assigned content includes at least one of an operator of an assembly line or an assembly date and time.

19. The identification tag of claim 7, wherein the object is a chip part to be mounted on a printed circuit board and the plurality of content includes at least one of a specification of said printed circuit board, a date of manufacture, a name of manufacturer, a serial number of said printed circuit board, a serial number of said chip part, a name of a factory, a manufacturing time, and an operator.

20. An object to which is attached the identification tag of claim 1.

* * * * *

UNITED STATES PATENT AND TRADEMARK OFFICE
CERTIFICATE OF CORRECTION

| | | |
|---|---|---|
| PATENT NO. | : 7,028,890 B2 | Page 1 of 1 |
| APPLICATION NO. | : 10/471407 | |
| DATED | : April 18, 2006 | |
| INVENTOR(S) | : Okie Tani | |

It is certified that error appears in the above-identified patent and that said Letters Patent is hereby corrected as shown below:

Title Page

Item (30), please add --Foreign Application Priority Data (JP) .................... 2001-77148

Mar. 16, 2001--

Signed and Sealed this

Twenty-second Day of July, 2008

JON W. DUDAS
*Director of the United States Patent and Trademark Office*